United States Patent
Bacarella et al.

(10) Patent No.: US 7,177,485 B2
(45) Date of Patent: Feb. 13, 2007

(54) METHOD AND SYSTEM FOR COMBINING IMAGE DATA

(75) Inventors: Antonio V. Bacarella, Dallas, TX (US); David W. Davis, Little Rock, AR (US); Timothy E. Ostromek, Richardson, TX (US)

(73) Assignee: Litton Systems, Inc., Woodland Hills, CA (US)

( * ) Notice: Subject to any disclaimer, the term of this patent is extended or adjusted under 35 U.S.C. 154(b) by 748 days.

(21) Appl. No.: 10/336,179

(22) Filed: Jan. 3, 2003

(65) Prior Publication Data

US 2004/0131277 A1    Jul. 8, 2004

(51) Int. Cl.
*G06K 9/32* (2006.01)
*G06K 9/00* (2006.01)

(52) U.S. Cl. ..................... 382/294; 382/154
(58) Field of Classification Search ............... 382/154, 382/293–300
See application file for complete search history.

(56) References Cited

U.S. PATENT DOCUMENTS 6,141,036 A   10/2000   Katayama et al.
6,549,650 B1 *  4/2003  Ishikawa et al. ............ 382/154

FOREIGN PATENT DOCUMENTS

EP   0 721 130   7/1996
GB   2 343 320   5/2000

OTHER PUBLICATIONS

International Search Report issued for PCT/US2004/000275, dated Sep. 29, 2004.

* cited by examiner

*Primary Examiner*—Bhavesh M. Mehta
*Assistant Examiner*—Wes Tucker
(74) *Attorney, Agent, or Firm*—Fulbright & Jaworski LLP

(57) ABSTRACT

A system and method for combining image data are disclosed. Sensor data sets (210, 212) are received from sensors (112). An image metric (214) with slots (217) is generated by repeating the following for each sensor data set (210, 212) until a final slot (217) of the image metric (214) is reached: generating display data from a subset of a sensor data set (210) for a slot (217) of the image metric, and generating display data from a subset of a next sensor data set (212) for a next slot (217) of the image metric (214). An image generated from the image metric (214) is displayed.

31 Claims, 3 Drawing Sheets

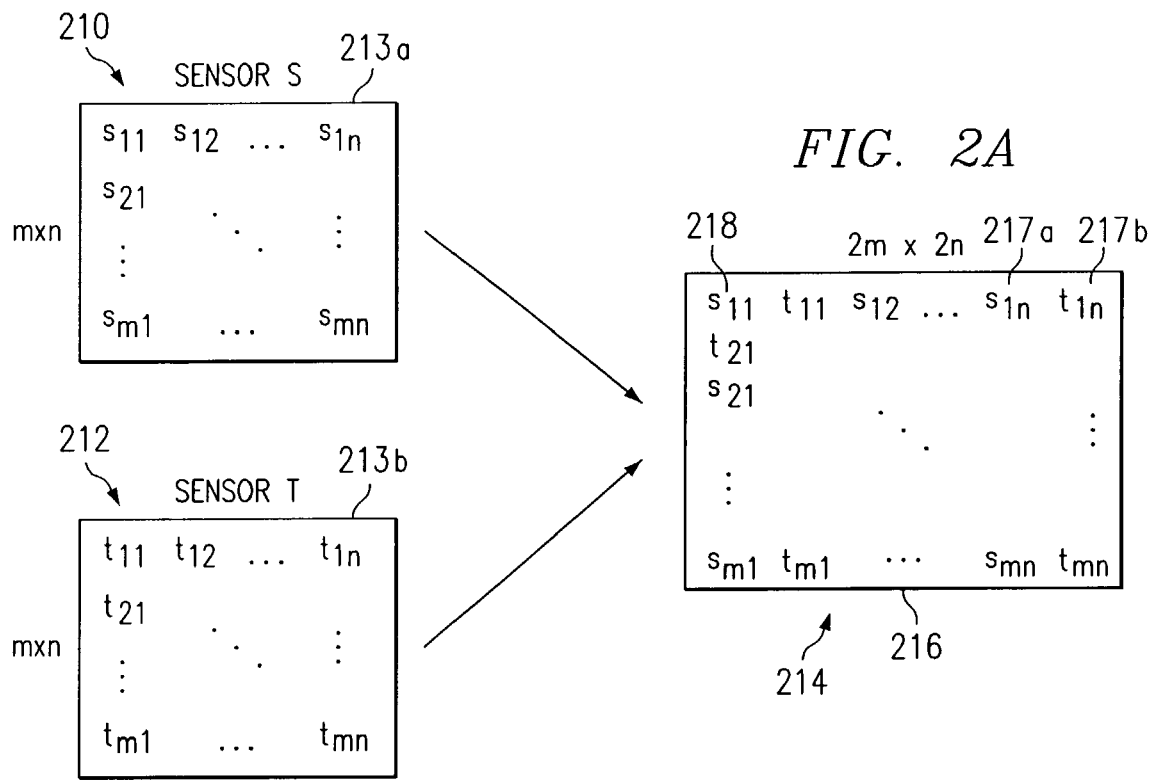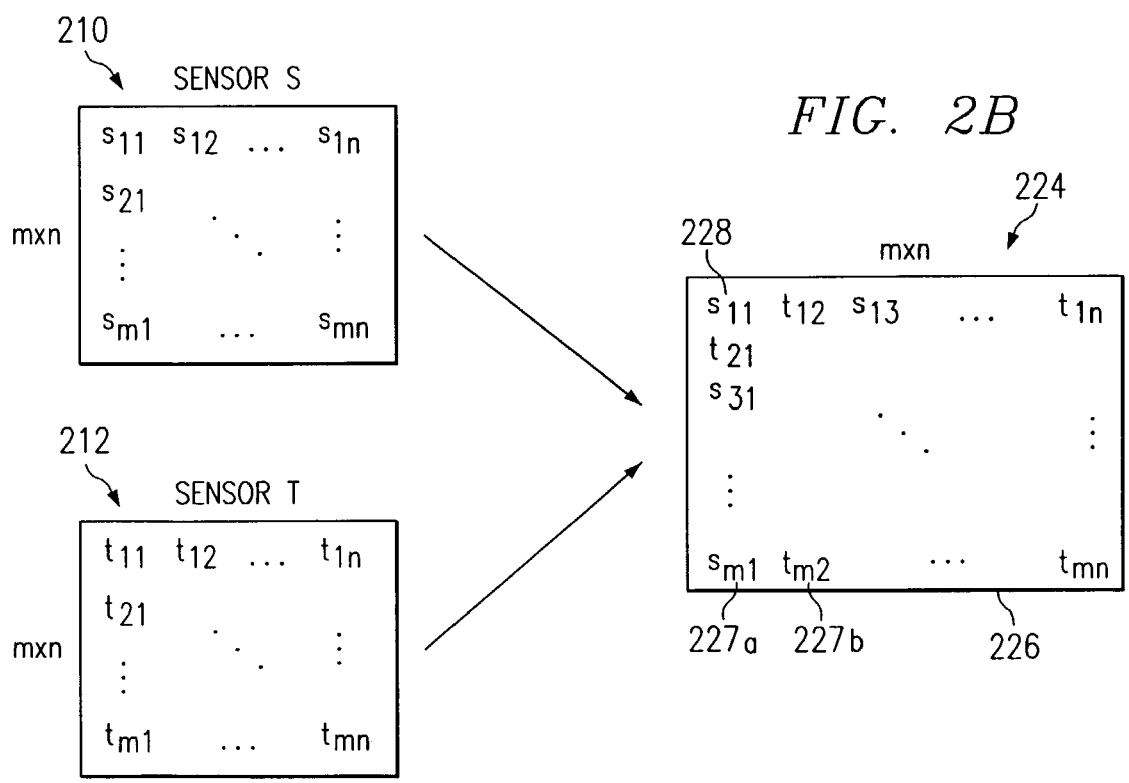

METHOD AND SYSTEM FOR COMBINING IMAGE DATA

TECHNICAL FIELD OF THE INVENTION

This invention relates generally to the field of imaging systems and more specifically to a method and system for combining image data.

BACKGROUND OF THE INVENTION

Multiple sensor imaging systems generate an image of an object by combining sensor data that is collected by multiple sensors. Combining sensor data from multiple sensors, however, has posed challenges. In some systems, the sensor data are fused together to generate an image. For example, sensor data from the sensors are processed to generate a pixel of the resulting image. Fusing sensor data, however, requires additional hardware or software components for fusing the sensor data. Additionally, fusing sensor data requires additional processing time and power, resulting in slower and less efficient imaging systems. Consequently, combining sensor data from multiple sensors has posed challenges for the design of imaging systems.

SUMMARY OF THE INVENTION

While known approaches have provided improvements over prior approaches, the challenges in the field of imaging systems have continued to increase with demands for more and better techniques having greater effectiveness. Therefore, a need has arisen for a new method and system for combining image data.

In accordance with the present invention, a method and system for combining image data are provided that substantially eliminate or reduce the disadvantages and problems associated with previously developed systems and methods.

According to one embodiment of the present invention, a method for combining image data is disclosed. A first sensor data set is received from a first sensor. The first sensor data set includes first subsets that have sensor data. A second sensor data set is received from a second sensor. The second sensor data set includes second subsets that have sensor data. An image metric with slots is generated by repeating the following until a final slot of the image metric is reached: generating display data from a first subset for a slot of the image metric, and generating display data from a second subset for a next slot of the image metric. An image generated from the image metric is displayed.

According to one embodiment of the present invention, a system for combining image data is disclosed. A first sensor generates a first sensor data set that includes first subsets that have sensor data. A second sensor generates a second sensor data set that includes second subsets that have sensor data. A combining module generates an image metric with slots by repeating the following until a final slot of the image metric is reached: generating display data from a first subset for a slot of the image metric, and generating display data from a second subset for a next slot of the image metric. A display displays an image generated from the image metric.

According to one embodiment of the present invention, a method for combining image data is disclosed. Sensor data sets are received from sensors. Each sensor data set includes subsets that have sensor data. An image metric with slots is generated by repeating the following for each sensor data set until a final slot of the image metric is reached: generating display data from a subset of a sensor data set from a sensor for a slot of the image metric, and generating display data from a subset of a next sensor data set from a next sensor for a next slot of the image metric. An image generated from the image metric is displayed.

According to one embodiment of the present invention, a system for combining image data is disclosed. Sensors generate sensor data sets that include subsets having sensor data. A combining module generates an image metric with slots by repeating the following for each sensor data set until a final slot of the image metric is reached: generating display data from a subset of a sensor data set from a sensor for a slot of the image metric, and generating display data from a subset of a next sensor data set from a next sensor for a next slot of the image metric. A display displays an image generated from the image metric.

Embodiments of the invention may provide numerous technical advantages. A technical advantage of one embodiment is that a portion, for example, a pixel, of an image is generated from only one sensor, thus eliminating the need to fuse sensor data from multiple sensors to produce the portion. Another technical advantage of one embodiment is that additional hardware or software is not required to fuse sensor data from multiple sensors, yielding a more compact system. Another technical advantage of one embodiment is that processing time and power are not required to fuse sensor data from multiple sensors, resulting in a faster and more efficient imaging system. Consequently, embodiments of the invention provide a compact, fast, and efficient method and system of combining image data.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIGS. 2A and 2B illustrate sensor data sets that may be combined to form a display data set;

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
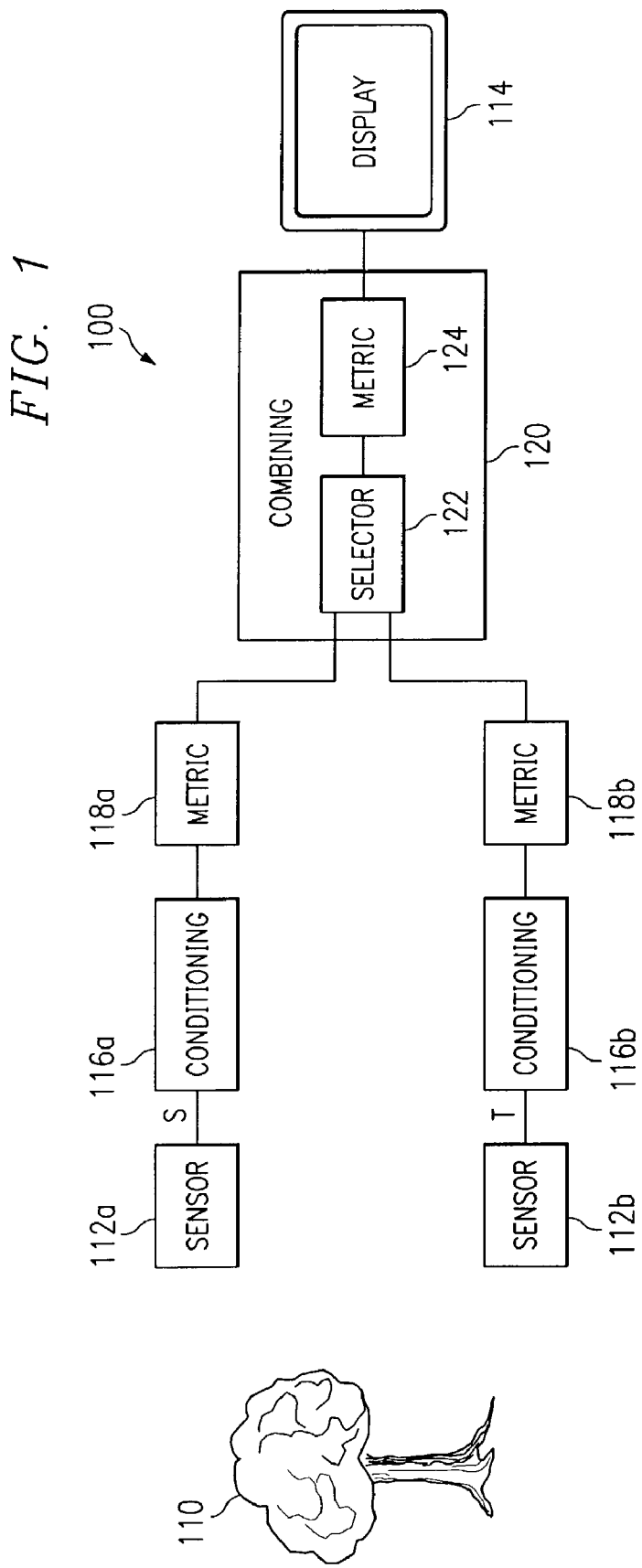
FIG. 1 is a block diagram of one embodiment of a system for combining sensor data that may be used in accordance with the present invention.

FIG. 1 is a block diagram of one embodiment of a system 100 for combining sensor data. In general, sensors 112a and 112b detect light reflected or emitted from an object 110 to generate sensor data. The sensor data are combined to generate an image of object 110 on a display 114. The light reflected from object 110 includes information that may be used to generate an image of object 110.

Specifically, sensors 112a and 112b detect light reflected or emitted from object 110 and generate sensor data in response to the light. Sensors 112 may include sensors that enhance certain features of light, such as an image intensifier sensor. Sensors 112, however, may include any suitable sensor such as different or substantially similar optical or electro-optical filters, for example, a long wave infrared sensor, a low light level charge coupled device (LLLCCD), or a complementary metal-oxide semiconductor (CMOS) sensor. Additionally, sensors 112 may differ from each other. In one embodiment, the sensor data may be conditioned by conditioning modules 116 coupled to sensors 112. Conditioning modules 116 may amplify the signal from sensors 112 that represents the sensor data. Conditioning modules 116 may also filter the signal by blocking or attenuating undesirable frequencies of the signal.

Metric modules 118 coupled to conditioning modules 116 may be used to organize the sensor data sets. A sensor data set may be represented as, for example, an m×n sensor metric having slots (i,j) populated with subsets $s_{ij}$. Subsets $s_{ij}$ may include data corresponding to a portion, for example, a pixel, of an image. Subsets $s_{ij}$ and $t_{ij}$, however, may include data corresponding to any portion of an image, for example, a row of an image.

A combining module 120 coupled to metric modules 118 combines the sensor data sets to generate a display data set. Combining module 120 includes a selector 122 coupled to a metric module 124. Selector 122 selects subsets from each sensor data set. "Each" as used here refers to each member of a set or each member of a subset of the set. Selector 122 may select subsets by identifying a subset by its location in a sensor metric and selecting the identified subset. Examples of the selection process are illustrated in connection with FIGS. 2 and 3. Metric module 124 places display data generated from the selected subsets into an image metric.

Display 114 coupled to combining module 120 generates an image from the image metric. Display 114 may include any suitable device for displaying image data such as an organic light-emitting diode (OLED), a nematic liquid-crystal display (LCD), or a field emitting display (FED), in a panel display, an eyepiece display, or a near-to-eye display format.

FIG. 2A illustrates sensor data sets 210 and 212 that may be combined to form a display data set 214. Sensor data sets 210 and 212 are provided by sensors 112a and 112b, respectively. Sensor data sets 210 and 212 may be represented as m×n sensor metrics 213 having slots (i,j) populated with subsets $s_{ij}$ and $t_{ij}$, respectively. Subsets $s_{ij}$ and $t_{ij}$ may include data corresponding to a portion, for example, a pixel, of an image. Subsets $s_{ij}$ and $t_{ij}$, however, may include data corresponding to any portion of an image, for example, a row of an image. Subsets $s_{ij}$ and $t_{ij}$ of each row may be ordered from left to right, and rows may be ordered from top to bottom. For example, subset $s_{11}$ is a first subset, $s_{12}, \ldots, S_{1n}$ are the next subsets, then $s_{22}, \ldots, s_{2n}$ are the next subsets, and $s_{m1}, \ldots, s_{mn}$ are the last subsets. Subsets $t_{ij}$ may be ordered in a substantially similar manner.

Sensor data sets 210 and 212 may be combined to form display data set 214 represented by a 2m×2n image metric 216. Image metric 216 has slots 217 that may be populated with display data subsets that are used to generate an image. Slots 217 of each row may be ordered from left to right, and rows made be ordered from top to bottom. To populate image metric 216, an initial slot 218 of display data set 214 is selected. A display data subset generated from a first subset $s_{11}$ is placed in initial slot 218. Display data may be generated from sensor data in any suitable manner. For example, display data may include sensor data transmitted directly from sensors 112. Alternatively, display data may include sensor data that has been conditioned by conditioning modules 116.

A next slot of image metric 216 is located, and a display data subset generated from a first data set $t_{11}$ from sensor data set 212 is placed in the next slot. Image metric 216 is populated by generating display data from sensor data set 210, and then from sensor data set 212, and then from sensor data set 210, and so on. When image metric 216 is populated, display data set 214 is complete.

Although the illustrated example uses two sensor data sets 210 and 212, any suitable number of sensor data sets may be used. To populate image metric 216, display data may be generated from the number of sensor data sets in a predetermined order in a manner substantially similar to the described process.

FIG. 2B illustrates sensor data sets 210 and 212 that may be combined to form a display data set 224. Display data set 224 may be represented as an image metric 226 that includes m×n slots 227. Image metric 226 may be substantially similar in size to sensor metrics 213 of sensor data sets 210 and 212. Additionally, a slot (i,j) of sensor metric 213 may correspond to a slot (i,j) of image metric 226.

To form display data set 224, display data generated from a subset of sensor data set 210 located in slot (i,j) of sensor metric 213a is placed in slot (i,j) of image metric 226, and display data generated from a subset of sensor data set 212 located in a next slot (i,j+1) of sensor metric 213b is placed in a next slot (i,j+1) of image metric 226. For example, an initial slot (1,1) 228 is determined. Display data generated from subset $s_{11}$ located in slot (1,1) of sensor data set 210 is placed in initial slot (1,1) 218. A next slot (1,2) of image metric 226 is located. Display data generated from subset $t_{12}$ of sensor data set 212 that is located in next slot (1,2) of sensor metric 213b is placed in slot (1,2) of image metric 226. By alternating between sensor data sets 210 and 212, image metric 226 is populated to form display data set 224.

Figure 3A:
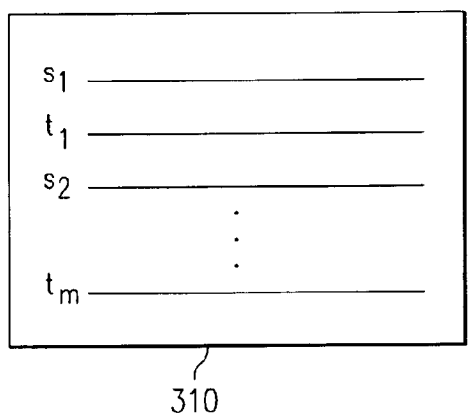
FIG. 3A illustrates an image metric populated with sensor data subsets that correspond to rows of an image metric.

FIG. 3A illustrates an image metric 310 populated with sensor data subsets that correspond to rows of image metric 310. Each sensor data subset $s_i$ and $t_i$ of sensor data sets S and T, respectively, includes data that correspond to a row of image metric 310. To populate image metric 310, display data is generated from a subset $s_1$ from sensor data set S, and then display data is generated from a subset $t_1$ from data set T. Display data set is generated by alternating between sensor data sets S and T until image metric 310 is filled.

Figure 3B:
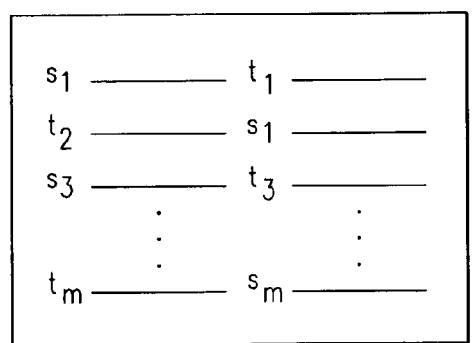
FIG. 3B illustrates an image metric populated with subsets that correspond to partial rows of an image metric.

FIG. 3B illustrates an image metric 320 populated with subsets that correspond to partial rows of image metric 320. Subsets $s_i$ and $t_i$ from sensor data sets S and T, respectively, include data that correspond to a partial row, for example, approximately one-half of a row of image metric 320. To populate image metric 320, data is generated from subset $s_1$ and then from subset $t_1$. To form the next row, sensor data sets S and T are permuted, such that display data is generated first from subset $t_2$ and then from subset $s_2$. To form the next row, the sensor data sets S and T are permuted once again, such that display data is generated first from subset $s_3$ and then from subset $t_3$.

Figure 4:
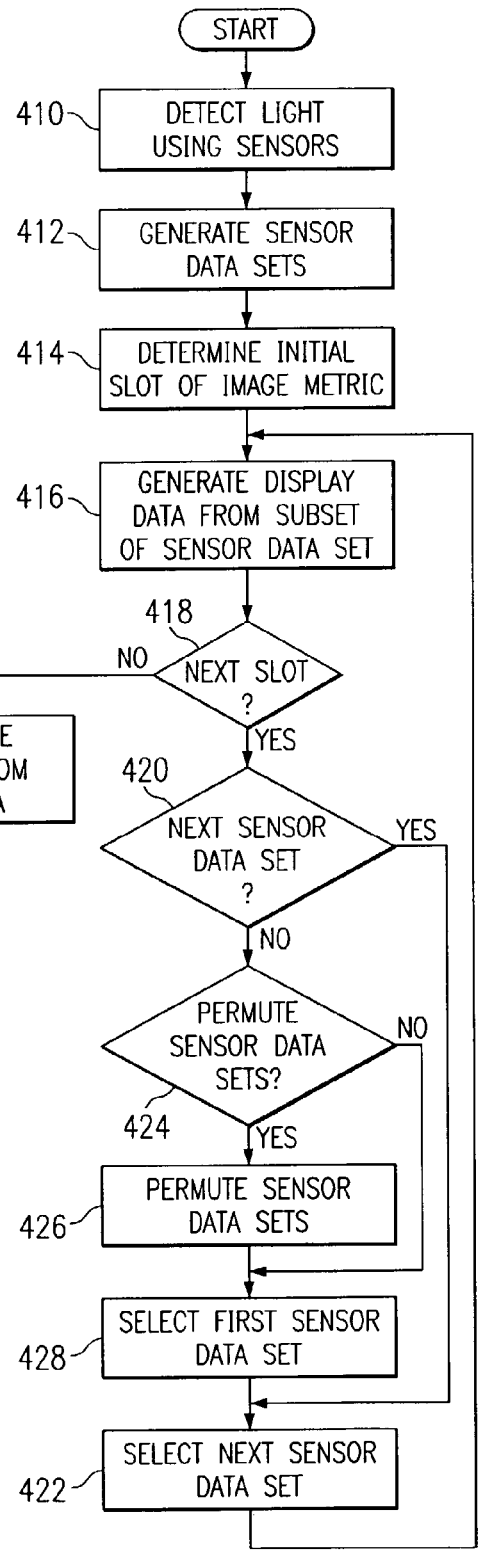
FIG. 4 is a flowchart demonstrating one embodiment of a method for combining sensor data that may be used in accordance with the present invention.

FIG. 4 is a flowchart of one embodiment of a method for combining image data that may be used with system 100 of FIG. 1. The method begins at step 410, where sensors 112 detect light reflected from object 110. The reflected light includes information that may be used to produce an image of object 110. At step 412, sensors 112 generate sensor data sets 210 and 212 in response to the detected light. Conditioning modules 116 may condition sensor data sets 210 and 212, and metric modules 118 may organize the data in sensor data sets 210 and 212. Sensor data sets 210 and 212 may be represented as m×n sensor metrics of sensor data subsets, and may be used to produce display data.

At step 414, initial slot (1,1) 218 of image metric 216 is determined by combining module 120. Image metric 216 has slots 217 for display data that may be used to generate an image. At step 416, display data is generated from a subset of a sensor data set. In the illustrated example, display data is generated from subset $s_{11}$ of sensor data set 210 and placed in initial slot (1,1) 218.

At step 418, combining module 120 determines whether there is a next slot (1,2) of image metric 216. If there is a next slot (1,2), the method proceeds to step 420 to determine whether there is a next sensor data set. If there is a next sensor data set, the method proceeds to step 422 to select the next sensor data set, which in this example is sensor data set 212. The method then returns to step 416, where display data is generated from a subset of the selected sensor data set 212. In the illustrated example, display data is generated from subset $t_{11}$ and placed in slot (1,2). The method then proceeds to step 418 to determine whether there is a next slot of image metric 216. If there is a next slot, the method proceeds to step 420 to determine whether there is a next sensor data set.

If there is no next sensor data set at step 420, the method proceeds to step 424 to determine whether sensor data sets 210 and 212 are to be permuted. If sensor data sets 210 and 212 are to be permuted, the method proceeds to step 426 to permute sensor data sets 210 and 212. For example, sensor data sets 210 and 212 may be permuted such that sensor data set 212 is the first sensor data set, and sensor data set 210 is the second sensor data set. The method then proceeds to step 428 to select the first sensor data set. If the data sets are not to be permuted at step 424, the method proceeds directly to step 428 to select the first sensor data set. The method then proceeds to step 416 to generate display data from a subset of the selected sensor data set.

If at step 418, there is no next slot of image metric 216, the method proceeds to step 430. At step 430, display 114 receives display data set 214 and displays an image generated from display data set 214. After displaying the image, the method terminates.

Embodiments of the invention may provide numerous technical advantages. A technical advantage of one embodiment is that a portion, for example, a pixel, of an image is generated from only one sensor, thus eliminating the need to fuse sensor data from multiple sensors to produce the portion. Another technical advantage of one embodiment is that additional hardware or software is not required to fuse sensor data from multiple sensors, yielding a more compact system. Another technical advantage of one embodiment is that processing time and power are not required to fuse sensor data from multiple sensors, resulting in a faster and more efficient imaging system. Consequently, embodiments of the invention provide a compact, fast, and efficient method and system of combining image data.

Although an embodiment of the invention and its advantages are described in detail, a person skilled in the art could make various alterations, additions, and omissions without departing from the spirit and scope of the present invention as defined by the appended claims.

What is claimed is:

1. A method for combining image data, the method comprising:

receiving a first sensor data set from a first sensor, the first sensor data set comprising a plurality of first subsets, each first subset comprising sensor data;

receiving a second sensor data set from a second sensor, the second sensor data set comprising a plurality of second subsets, each second subset comprising sensor data;

generating an image metric comprising a plurality of rows, each of said rows comprising a plurality of slots, by repeating the following steps for each row starting with an initial slot until a final slot of the image metric is reached:

selecting display data from either a first subset or a second subset to be used in a slot of the image metric; and selecting display data from the other one of said first subset or said second subset to be used in a next slot of the image metric, such that the slots of at least one of said rows of the image metric have a different sequence of said first and second subset display data than one or more of the other of said rows; and displaying an iznagc generated from the image metric.

2. The method of claim 1, wherein:

each first subset comprises sensor data corresponding to a pixel of the image metric; and each second subset comprises sensor data corresponding to a pixel of the image metric.

3. The method of claim 1, wherein:

each first subset comprises sensor data corresponding to a slot of the image metric; and each second subset comprises sensor data corresponding to a slot of the image metric.

4. The method of claim 1, wherein:

each first subset comprises sensor data corresponding to a portion of a row of the image metric; and each second subset comprises sensor data corresponding to a portion of a row of the image metric.

5. The method of claim 1, further comprising permuting the first sensor data set and the second sensor data set.

6. The method of claim 1, wherein:

the first sensor data set is associated with a first sensor metric comprising a plurality of slots;

the second sensor data set is associated with a second sensor metric comprising a plurality of slots; and a slot of the first sensor metric and a slot of the second sensor metric correspond to a same slot of the image metric.

7. The method of claim 1, wherein:

the first sensor data set is associated with a first sensor metric comprising a plurality of slots;

the second sensor data set is associated with a second sensor metric comprising a plurality of slots; and each slot of the image metric corresponds to at most one slot of the first sensor metric and the second sensor metric.

8. A system for combining image data, the system comprising:

a first sensor operable to generate a first sensor data set comprising a plurality of first subsets, each first subset comprising sensor data;

a second sensor operable to generate a second sensor data set comprising a plurality of second subsets, each second subset comprising sensor data;

a combining module coupled to the first sensor and to the second sensor and operable to generate an image metric comprising a plurality of rows, each of said rows comprising a plurality of slots, by repeating the following steps for each row starting with an initial slot until a final slot of the image metric is reached:

selecting display data from either a first subset or a second subset to be used in a slot of the image metric; and selecting display data from the other one of said first subset or said second subset to be used in a next slot of the image metric, such that the slots of at least one of said rows of the image metric have a different sequence of said first and second subset display data than one or more of the other of said rows a display coupled to the combining module and operable to display an image generated from the image metric.

9. The system of claim 8, wherein:

each first subset comprises sensor data corresponding to a pixel of the image metric; and each second subset comprises sensor data corresponding to a pixel of the image metric.

10. The system of claim 8, wherein:

each first subset comprises sensor data corresponding to a slot of the image metric; and each second subset comprises sensor data corresponding to a slot of the image metric.

11. The system of claim 8, wherein:

each first subset comprises sensor data corresponding to a portion of a row of the image metric; and each second subset comprises sensor data corresponding to a portion of a row of the image metric.

12. The system of claim 8, wherein the combining module is operable to permute the first sensor data set and the second sensor data set.

13. The system of claim 8, wherein:

the first sensor data set is associated with a first sensor metric comprising a plurality of slots;

the second sensor data set is associated with a second sensor metric comprising a plurality of slots; and a slot of the first sensor metric and a slot of the second sensor metric correspond to a same slot of the image metric.

14. The system of claim 8, wherein:

the first sensor data set is associated with a first sensor metric comprising a plurality of slots;

the second sensor data set is associated with a second sensor metric comprising a plurality of slots; and each slot of the image metric corresponds to at most one slot of the first sensor metric and the second sensor metric.

15. A method for combining image data, the method comprising:

receiving a plurality of sensor data sets from a plurality of sensors, each sensor data set comprising a plurality of subsets, each subset comprising sensor data;

generating an image metric comprising a plurality of rows, each of said rows comprising a plurality of slots, by repeating the following steps for each row starting with an initial slot until a final slot of the image metric is reached:

selecting display data from one of said subsets to be used in a slot of the image metric; and selecting display data from a different one of said subsets to be used in a next slot of the image metric, such that the slots of at least one of said rows of the image metric have a different sequence of subset display data than one or more of the other of said rows; and displaying an image generated from the image metric.

16. The method of claim 15, wherein each subset comprises sensor data corresponding to a pixel of the image metric.

17. The method of claim 15, wherein each subset comprises sensor data corresponding to a slot of the image metric.

18. The method of claim 15, wherein each subset comprises sensor data corresponding to a portion of a row of the image metric.

19. The method of claim 15, further comprising permuting the sensor data sets.

20. The method of claim 15, wherein:

each sensor data set is associated with a sensor metric comprising a plurality of slots; and a slot of each sensor metric corresponds to a same slot of the image metric.

21. The method of claim 15, wherein:

each sensor data set is associated with a sensor metric comprising a plurality of slots; and each slot of the image metric corresponds to at most one slot of at most one sensor metric.

22. A system for combining image data, the system comprising:

a plurality of sensors, each sensor operable to generate a sensor data set comprising a plurality of subsets, each subset comprising sensor data;

a combining module coupled to the sensors and operable to generate an image metric comprising a plurality of rows, each of said rows comprising a plurality of slots, by repeating the following steps for each row starting with an initial slot until a final slot of the image metric is reached:

selecting display data from one of said subsets to be used in a slot of the image metric; and selecting display data from a different one of said subsets to be used in a next slot of the image metric, such that the slots of at least one of said rows of the image metric have a different sequence of subset display data than one or more of the other of said rows; and a display coupled to the combining module and operable to display an image generated from the image metric.

23. The system of claim 22, wherein each subset comprises sensor data corresponding to a pixel of the image metric.

24. The system of claim 22, wherein each subset comprises sensor data corresponding to a slot of the image metric.

25. The system of claim 22, wherein each subset comprises sensor data corresponding to a portion of a row of the image metric.

26. The system of claim 22, wherein the combining module is operable to permute the sensor data sets.

27. The system of claim 22, wherein:

each sensor data set is associated with a sensor metric comprising a plurality of slots; and a slot of each sensor metric corresponds to a same slot of the image metric.

28. The system of claim 22, wherein:

each sensor data set is associated with a sensor metric comprising a plurality of slots; and each slot of the image metric corresponds to at most one slot of at most one sensor metric.

29. A system for combining image data, the system comprising:

a first sensor operable to generate a first sensor data set comprising a plurality of first subsets, each first subset comprising sensor data corresponding to a pixel of an image metric, the first sensor data set associated with a first sensor metric;

a second sensor operable to generate a second sensor data set comprising a plurality of second subsets, each second subset comprising sensor data corresponding to a pixel of the image metric, the second sensor data set associated with a second sensor metric;

a combining module coupled to the first sensor and to the second sensor and operable to generate the image metric comprising a plurality of rows, each of said rows comprising a plurality of slots, wherein a slot of the first sensor metric and a slot of the second sensor metric correspond to a same slot of the image metric, by repeating the following steps for each row starting with an initial slot until a final slot of the image metric is reached:

generating display data from a first subset for a slot of the image metric; and generating display data from a second subset for a next slot of the image metric such that the slots of at least one of said rows of the image metric have a different sequence of said first and second subset display data than one or more of the other of said rows; and a display coupled to the combining module and operable to display an image generated from the image metric.

30. The method of claim 15, wherein the plurality of sensors comprises three or more sensors.

31. The system of claim 22, wherein the plurality of sensors comprises three or more sensors.

* * * * *

UNITED STATES PATENT AND TRADEMARK OFFICE
CERTIFICATE OF CORRECTION

| | |
|---|---|
| PATENT NO. | : 7,177,485 B2 |
| APPLICATION NO. | : 10/336179 |
| DATED | : February 13, 2007 |
| INVENTOR(S) | : Antonio V. Bacarella et al. |

It is certified that error appears in the above-identified patent and that said Letters Patent is hereby corrected as shown below:

In the Claims:

Claim 1 in column 6, line number 19, delete the text "iznagc" and replace with --image--.

Signed and Sealed this

First Day of May, 2007

JON W. DUDAS
*Director of the United States Patent and Trademark Office*